United States Patent
Chao et al.

(10) Patent No.: US 12,493,516 B2
(45) Date of Patent: Dec. 9, 2025

(54) DATA SECURITY METHOD AND DATA SECURITY SYSTEM

(71) Applicant: Montage Electronics (Shanghai) Co., Ltd., Shanghai (CN)

(72) Inventors: Yang Chao, Shanghai (CN); Zhaohui Du, Shanghai (CN); Men Long, Shanghai (CN); Xiaoyan Li, Shanghai (CN); Dajiang Zhong, Shanghai (CN)

(73) Assignee: Montage Electronics (Shanghai) Co., Ltd., Shanghai (CN)

( * ) Notice: Subject to any disclaimer, the term of this patent is extended or adjusted under 35 U.S.C. 154(b) by 191 days.

(21) Appl. No.: 18/241,992

(22) Filed: Sep. 4, 2023

(65) Prior Publication Data

US 2024/0078151 A1    Mar. 7, 2024

(30) Foreign Application Priority Data

Sep. 5, 2022 (CN) .......................... 202211095398.2

(51) Int. Cl.
*G06F 11/10* (2006.01)
*G06F 11/07* (2006.01)
*G06F 21/60* (2013.01)

(52) U.S. Cl.
CPC ............ *G06F 11/10* (2013.01); *G06F 11/076* (2013.01); *G06F 21/602* (2013.01)

(58) Field of Classification Search
CPC ...... G06F 11/10; G06F 11/076; G06F 21/602; G06F 11/3034; G06F 11/3409; G06F 11/3466; G06F 2201/88; G06F 21/79; G06F 21/64
See application file for complete search history.

(56) References Cited

U.S. PATENT DOCUMENTS

| | | | |
|---|---|---|---|
| 8,666,070 B2 * | 3/2014 | Pezeshki | G06F 9/30058 726/36 |
| 2008/0022124 A1 * | 1/2008 | Zimmer | G06F 21/602 713/189 |
| 2020/0104208 A1 * | 4/2020 | Heo | G06F 3/0619 |

* cited by examiner

*Primary Examiner* — Abiy Getachew
(74) *Attorney, Agent, or Firm* — IPRTOP LLC

(57) ABSTRACT

A data security method and data security system configured to applied to a memory controller are provided. The data security method comprises: receiving a data writing request, wherein the data writing request comprises data to be written to a storage module and a storage address of the data; acquiring verification information of the data; and writing the data into the storage address, and writing the verification information into a redundant ECC bit corresponding to the data. The data security method and data security system according to the present disclosure can achieve the secure storage and reading of the data without extra space overhead, while maintaining high bandwidth and throughput.

14 Claims, 8 Drawing Sheets

---

S11 — Receiving a data writing request, the data writing request comprises data to be written to a storage module and a storage address of the data S12 — Acquiring verification information of the data S13 — Writing the data into the storage address, and writing the verification information into a redundant ECC bit corresponding to the data

| | Channel A | | Channel B | |
|---|---|---|---|---|
| | data[31:0] | counter[7:0] | data[31:0] | counter[7:0] |
| | data[63:32] | counter[15:8] | data[63:32] | counter[15:8] |
| | data[95:64] | counter[23:16] | data[95:64] | counter[23:16] |
| | data[127:96] | counter[31:24] | data[127:96] | counter[31:24] |
| | data[159:128] | counter[39:32] | data[159:128] | counter[39:32] |
| | data[191:160] | counter[47:40] | data[191:160] | counter[47:40] |
| | data[223:192] | counter[55:48] | data[223:192] | counter[55:48] |
| 0-15 Burst | data[255:224] | counter[63:56] | data[255:224] | counter[63:56] |
| | data[287:256] | ecc[7:0] | data[287:256] | ecc[7:0] |
| | data[319:288] | ecc[15:8] | data[319:288] | ecc[15:8] |
| | data[351:320] | ecc[23:16] | data[351:320] | ecc[23:16] |
| | data[383:352] | ecc[31:24] | data[383:352] | ecc[31:24] |
| | data[415:384] | ecc[39:32] | data[415:384] | ecc[39:32] |
| | data[447:416] | ecc[47:40] | data[447:416] | ecc[47:40] |
| | data[479:448] | ecc[55:48] | data[479:448] | ecc[55:48] |
| | data[511:480] | ecc[63:56] | data[511:480] | ecc[63:56] |

FIG. 3

| data[63:32] | ecc[7:0] |
|---|---|
| data[127:96] | ecc[15:8] |
| data[191:160] | ecc[23:16] |
| data[255:224] | ecc[31:24] |
| data[319:288] | ecc[39:32] |
| data[383:352] | ecc[47:40] |
| data[447:416] | ecc[55:48] |
| data[511:480] | ecc[63:56] |

| data[31:0] | counter[7:0] |
|---|---|
| data[95:64] | counter[15:8] |
| data[159:128] | counter[23:16] |
| data[223:192] | counter[31:24] |
| data[287:256] | counter[39:32] |
| data[351:320] | counter[47:40] |
| data[415:384] | counter[55:48] |
| data[479:448] | counter[63:56] |

0-7 Burst

| Channel A | | | Channel B | |
|---|---|---|---|---|
| data[31:0] | mac[7:0] | | data[31:0] | mac[7:0] |
| data[63:32] | mac[15:8] | | data[63:32] | mac[15:8] |
| data[95:64] | mac[23:16] | | data[95:64] | mac[23:16] |
| data[127:96] | mac[31:24] | | data[127:96] | mac[31:24] |
| data[159:128] | mac[39:32] | | data[159:128] | mac[39:32] |
| data[191:160] | mac[47:40] | | data[191:160] | mac[47:40] |
| data[223:192] | mac[55:48] | | data[223:192] | mac[55:48] |
| data[255:224] | mac[63:56] | | data[255:224] | mac[63:56] |
| data[287:256] | ecc[7:0] | | data[287:256] | ecc[7:0] |
| data[319:288] | ecc[15:8] | | data[319:288] | ecc[15:8] |
| data[351:320] | ecc[23:16] | | data[351:320] | ecc[23:16] |
| data[383:352] | ecc[31:24] | | data[383:352] | ecc[31:24] |
| data[415:384] | ecc[39:32] | | data[415:384] | ecc[39:32] |
| data[447:416] | ecc[47:40] | | data[447:416] | ecc[47:40] |
| data[479:448] | ecc[55:48] | | data[479:448] | ecc[55:48] |
| data[511:480] | ecc[63:56] | | data[511:480] | ecc[63:56] |

0-15 Burst

FIG. 6

DATA SECURITY METHOD AND DATA SECURITY SYSTEM

CROSS REFERENCE TO RELATED APPLICATION

The present application claims the benefit of priority to Chinese Patent Application No. CN 2022110953982, entitled "DATA SECURITY METHOD AND DATA SECURITY SYSTEM", filed with CNIPA on Sep. 5, 2022, the disclosure of which is incorporated herein by reference in its entirety.

FIELD OF TECHNOLOGY

The present disclosure relates to the technical field of data security, and in particular, to a data security method and a data security system.

BACKGROUND

In related technologies, in order to ensure the security of data storage, the following two methods are usually used to encrypt and decrypt data:
(1) Encryption and decryption are performed on a memory (e.g., a storage module) by using an Advanced Encryption Standard-XEX Tweakable Block Cipher with Ciphertext Stealing (AES-XTS) algorithm through an encryption and decryption hardware engine arranged in a host. However, when the data written at two different time points are the same, the obtained two ciphertexts will also be the same. Therefore, the above-mentioned method lacks the ability to match a plaintext to a corresponding ciphertext when having two same ciphertexts.
(2) A serial interface memory expander protects compute express links (CXLs) by adopting an Advanced Encryption Standard-Galois/Counter Mode (AES-GCM) in the security standard defined by CXL 2.0. However, for serial bus memory expanders, the CXL standard only defines security characteristics of the CXL between the host and the device, so that the data stored in the memory may be in the form of plaintext. Therefore, CXL's security standard is incomplete and cannot protect other parts of the device.

Thus, there is a need to provide a more advanced and secure data storage algorithm.

SUMMARY

The present disclosure provides a data security method and a data security system that can achieve the secure storage and reading of data without occupying extra space, while maintaining a high bandwidth and throughput.

The data security method is applied to a memory controller and comprises: receiving a data writing request, wherein the data writing request comprises data to be written to a storage module and a storage address of the data; acquiring verification information of the data; and writing the data into the storage address, and writing the verification information into a redundant ECC bit corresponding to the data.

In an embodiment of the present disclosure, acquiring the verification information of the data comprises: updating a count value of a counter to obtain an updated count value after receiving the data writing request, calculating an ECC value based on the updated count value, and using the updated count value and the ECC value as the verification information.

In an embodiment of the present disclosure, updating the count value of the counter comprises: adding a preset value to the count value of the counter to obtain the updated count value.

In an embodiment of the present disclosure, the counter contains information of the count value and the ECC value.

In an embodiment of the present disclosure, writing the data into the storage address comprises: processing the data to obtain a processed data based on the updated count value, and writing the processed data into the storage address.

In an embodiment of the present disclosure, processing the data to obtain a processed data based on the updated count value comprises: encrypting the updated count value to obtain an encrypted count value; and performing an XOR operation on the encrypted count value and the data to obtain the processed data.

In an embodiment of the present disclosure, the verification information further comprises a message authentication code, wherein acquiring the verification information of the data comprises: obtaining the message authentication code from a crypto logic module.

The present disclosure further provides a data security method, applied to a memory controller, comprising: receiving a data reading request, wherein the data reading request comprises a storage address of data to be read; searching for the data based on the storage address, and verifying verification information in a redundant ECC bit corresponding to the data; and acquiring the data when the verification information is determined to be valid.

In an embodiment of the present disclosure, the verification information comprises a count value and an ECC value, wherein verifying the verification information in the redundant ECC bit corresponding to the data comprises: verifying the count value based on the ECC value, and decrypting the data based on the count value when the count value is determined to be valid, so as to obtain the data.

In an embodiment of the present disclosure, the verification information comprises a pre-stored message authentication code, wherein verifying the verification information in the redundant ECC bit corresponding to the data comprises: obtaining a calculated message authentication code of the data through calculating, and comparing the calculated message authentication code with the pre-stored message authentication code of the verification information in the redundant ECC bit.

The present disclosure further provides a data security system, comprising a memory controller and a storage module, wherein the memory controller comprises: a request receiving module configured to receive a data writing request, wherein the data writing request comprises data to be written to the storage module and a storage address of the data; an information acquisition module configured to obtain verification information of the data; and a data writing module, configured to write the data into the storage address and write the verification information into a redundant ECC bit corresponding to the data.

The present disclosure further provides a data security system, comprising a memory controller and a storage module, wherein the memory controller comprises: a request receiving module configured to receive a data reading request, wherein the data reading request comprises a storage address of data to be read; a data verification module, which is configured to search for the data based on the storage address and to verify verification information in a redundant ECC bit corresponding to the data; and a data acquisition module configured to acquire the data when the verification information is determined to be valid.

BRIEF DESCRIPTION OF THE DRAWINGS

FIG. 3 shows a schematic storage diagram of a DDR5 system having independent dual channels according to an embodiment of the present disclosure.

FIG. 6 shows a schematic storage diagram of a DDR5 system according to another embodiment of the present disclosure.

DETAILED DESCRIPTION

The embodiments of the present disclosure will be described below. Those skilled can easily understand disclosure advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It should be noted that the following embodiments and the features of the following embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape and size of the components in actual implementation; during the actual implementation, the type, quantity and proportion of each component can be changed as needed, and the components' layout may also be more complicated.

According to the data security method and data security system of the present disclosure, the verification information of the data is stored in a redundant ECC bit corresponding to the data, and different ciphertexts can be provided when plaintexts are the same. So that the secure storage and reading of the data can be achieved without occupying extra space while maintaining high bandwidth and throughput, and the data security method and data security system of the present disclosure are highly practical.

Figure 1:
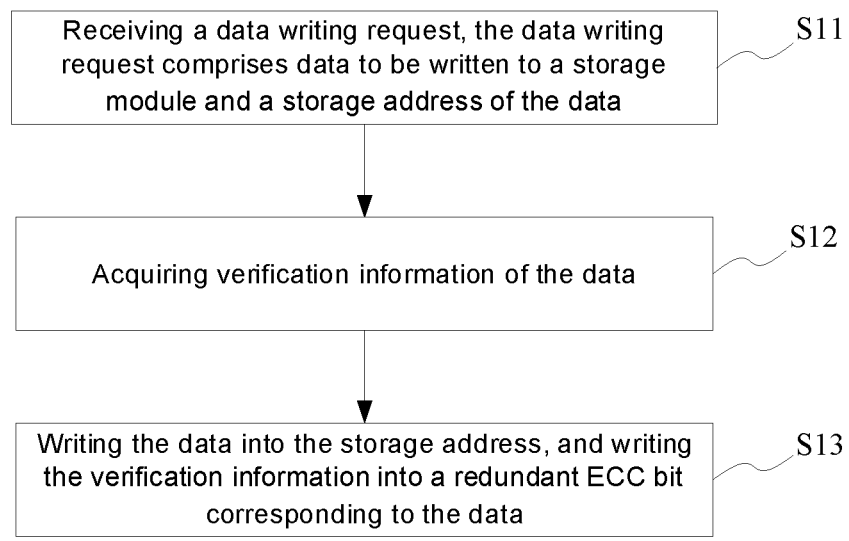
FIG. 1 shows a flowchart of a data security method according to an embodiment of the present disclosure.

In an embodiment as shown in FIG. 1, a data security method of the present disclosure is applied to a memory controller, and the data security method comprises:

Step S11: receiving a data writing request, wherein the data writing request comprises data to be written to a storage module and a storage address of the data.

Step S12: acquiring verification information of the data.

Step S13: writing the data into the storage address, and writing the verification information into a redundant ECC bit corresponding to the data.

In some embodiments, the memory controller first obtains the verification information of the data when receiving the data writing request.

In some embodiments, the verification information of the data comprises a count value and an ECC value calculated based on the count value. Specifically, when receiving the data writing request, the memory controller updates the count value of a counter to obtain an updated count value, calculates the ECC value of the updated count value to obtain a calculated ECC value, and uses the updated count value and the calculated ECC value as the verification information. In some embodiments, when the count value of the counter is updated, the memory controller may add a preset value (e.g., 1) to the count value of the counter to obtain an updated count value. It should be noted that the initial count value of the counter may be set by the system. In the present disclosure, a storage address of original data corresponding to the counter is a first part of the counter, a count value is a second part of the counter, an ECC value corresponding to the count value is a third part of the counter, and a random parameter is a fourth part of the counter. Specifically, the first and fourth parts of the counter do not need to be stored, and the random parameter is randomly generated by a true random number generator every time the system is initialized. The true random number generator may be provided in the memory controller, or may be provided independent of the memory controller. When obtaining the verification information, the memory controller processes the data to obtain a processed data based on the updated count value, writes the processed data into the storage address, and writes the verification information into the redundant ECC bit corresponding to the data. Specifically, the memory controller first encrypts the updated count value to obtain an encrypted count value, then performs an XOR operation on the encrypted count value and the data to obtain the processed data, and finally stores the processed data in the storage address and writes the verification information into the redundant ECC bit corresponding to the data. A key configured to encrypt the count value may be distributed by software; for example, the key is distributed by a key distribution module.

In some embodiments, the verification information of the data comprises a message authentication code, or MAC. The memory controller may obtain a message authentication code from a crypto logic module every time the data writing request is received, and the respective message authentication codes obtained are different. The crypto logic module may be provided in the memory controller, or may be provided independent of the memory controller The memory controller writes the data into the storage address after obtaining the corresponding message authentication code, and writes the message authentication code into the redundant ECC bit corresponding to the data.

As described above, in the present disclosure, the verification information of the data is stored in the redundant ECC bit corresponding to the data. Without sacrificing performance or throughput, the plaintext of the data stored in the storage module can be well protected without extra space occupied. It should be noted that the redundant ECC bit stores, among other things, count values or message authentication codes of AES or SM4 working modes such as GCM and CTR.

The data security method of the present disclosure may be applied to a dual-channel mode and a single-channel mode of a double data rate 5 (DDR5) system and any suitable data storage systems. The dual-channel mode and the single-channel mode of the DDR5 system applying the data security method of the present disclosure will be illustrated below.

Figure 2:
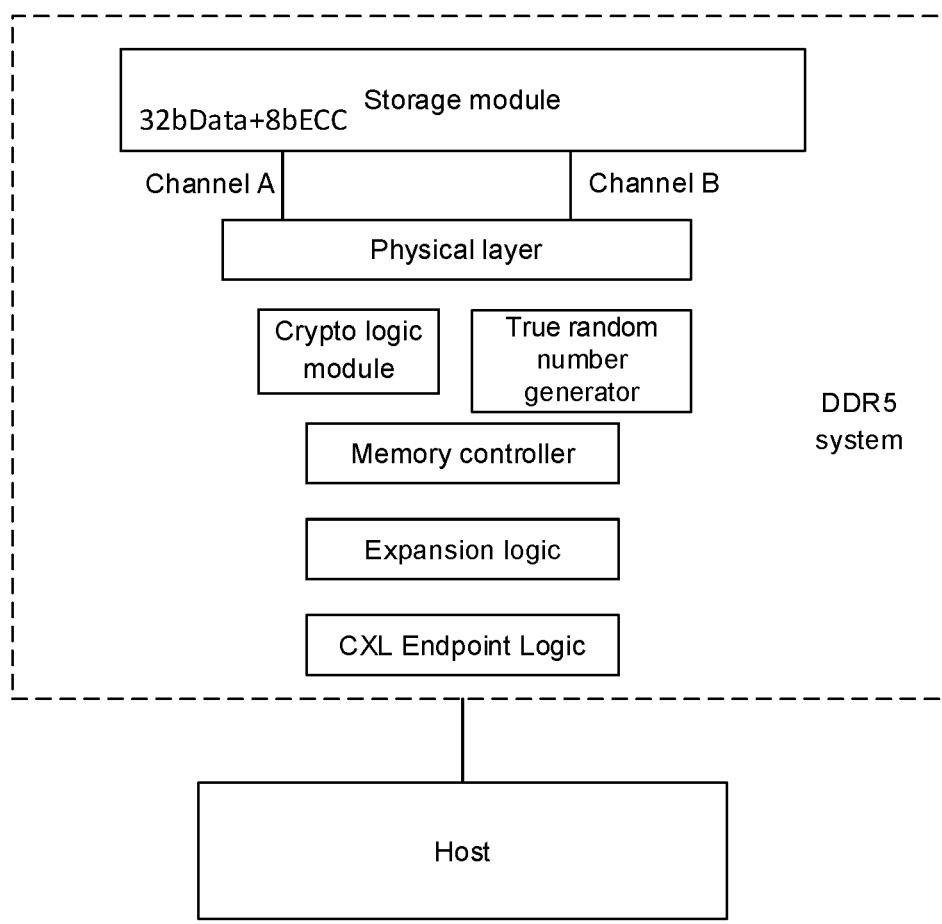
FIG. 2 shows a schematic structural diagram of a DDR5 system having independent dual channels according to an embodiment of the present disclosure.
Figure 4:
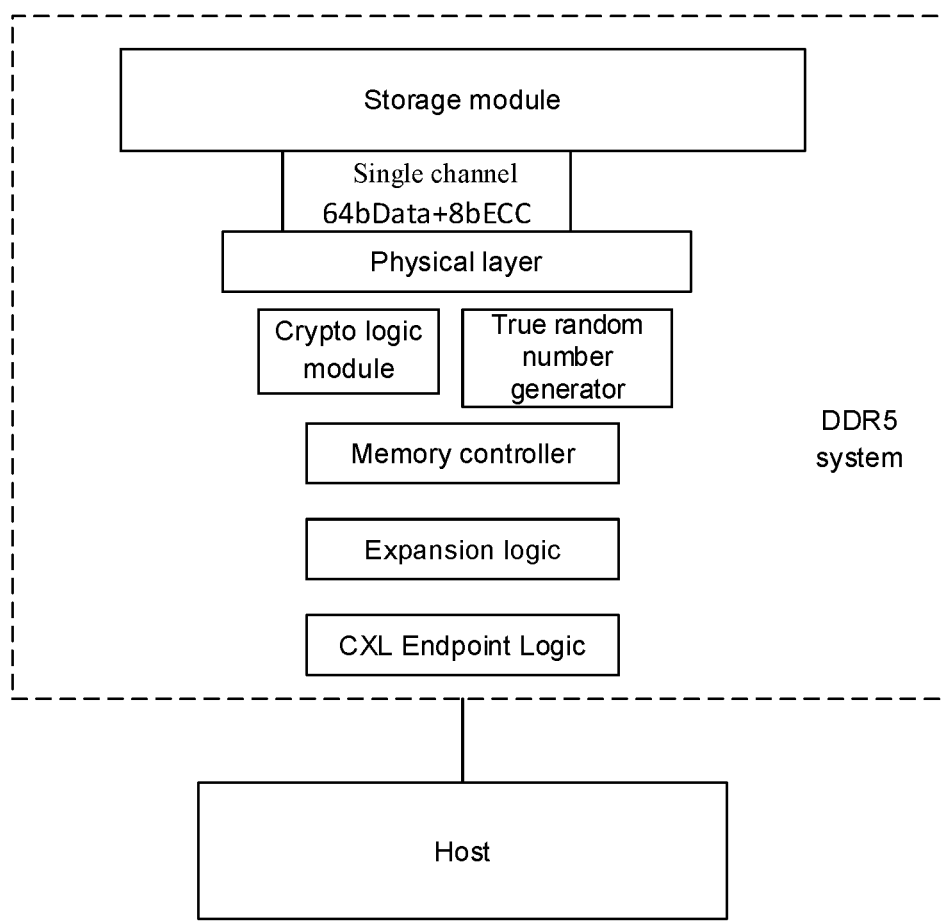
FIG. 4 shows a schematic structural diagram of a DDR5 system having a single channel according to an embodiment of the present disclosure.

As shown in FIGS. 2 and 4, the DDR5 system comprises a CXL endpoint logic, an expansion logic, a memory controller, a crypto logic module, a true random number generator, a physical layer (PHY) and a storage module. In one embodiment as shown in FIG. 2, in the dual-channel mode (i.e., channel A and channel B), each channel interface has a 32-bit data width and an 8-bit ECC. As shown in FIG. 4, in the single-channel mode, two channels can be combined into one channel for use, at which time the data width of the channel interface is 64 bits and the ECC is 8 bits. In the DDR5 system, the CXL endpoint logic receives a data writing request sent by a host, and transmits the data writing request to the memory controller through the expansion logic. The memory controller obtains verification information after receiving the data writing request, writes data into the storage module through two channels between the physical layer and the storage module, and writes the verification information into a redundant ECC bit corresponding to the data.

In the case of independent dual channels, bits that are not used in a check bit with 8-bit ECC corresponding to the channel interface with 32-bit data width, i.e., the redundant ECC bit, are configured to store the verification information. When a burst transmission length of 32-bit data is sixteen, it is assumed that a Reed-Solomon (18, 16) code pattern is used to obtain sixty-four un-used bits for storing the four parts of the counter, that is, the storage address of the original data corresponding to the counter, the count value, the ECC value corresponding to the count value, and the random parameter.

With the verification information comprising the count value and the ECC value as an example, in the dual-channel mode, the memory controller writes 512-bit data into the storage module with two steps. In the first step, the memory controller stores 256-bit data therein in an address A of the storage module, wherein the address A is carried in the data writing request, and the memory controller stores the count value in the corresponding redundant ECC bit. In the second step, the memory controller stores the additional 256-bit data in an address B of the storage module, and stores the ECC value in the corresponding redundant ECC bit. The address A and the address B are located in two adjacent or non-adjacent rows of a memory bank, and the ECC value is configured to protect the integrity of the entire 512-bit data. FIG. 3 shows a format of the data stored in the storage module in the dual-channel mode.

Figure 5:
FIG. 5 shows a schematic storage diagram of a DDR5 system having a single channel according to an embodiment of the present disclosure.

In the single-channel mode, bits that are not used in a check bit with 8-bit ECC corresponding to the channel interface with 64-bit data width, i.e., the redundant ECC bit, are configured to store the verification information. When the burst transmission length is 8, it is assumed that a Reed-Solomon (18, 16) code pattern or SEC-DED (72b, 64b) is used to obtain sixty-four un-used bits. Specifically, the Reed-Solomon (18, 16) code pattern refers to that sixteen original codewords correspond to eighteen encoded codewords, and one codeword comprises eight bits. With the verification information comprising the count value and the ECC value as an example, in the single-channel mode, the memory controller writes 512-bit data into the address A of the storage module, and writing requests the count value and the ECC value into the corresponding redundant ECC bit. FIG. 5 shows a format of the data stored in the storage module in the single-channel mode.

If a MAC value is used as the verification information, the MAC value may be written into the redundant ECC bit corresponding to the data. As shown in FIG. 6, the integrity of the data is verified by adopting 64-bit Reed-Solomon (18, 16) ECC encoding and storing another 64 bits as the MAC value, in which case the count value of the counter is not stored in a dynamic random access memory (DRAM) die, and instead the MAC value is calculated by adopting an AES-GCM algorithm.

Figure 7:
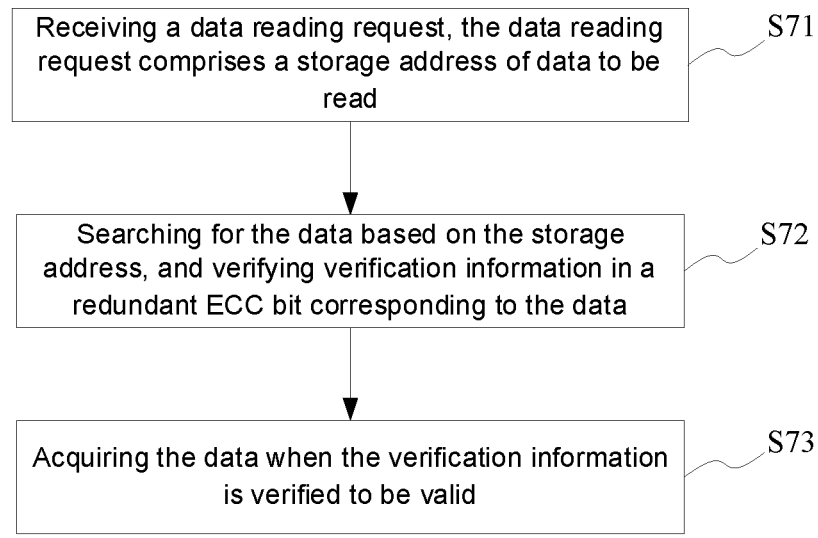
FIG. 7 shows a flowchart of a data security method according to another embodiment of the present disclosure.

In another embodiment, as shown in FIG. 7, a data security method of the present disclosure is applied to a memory controller, comprising:

Step S71: receiving a data reading request, wherein the data reading request comprises a storage address of data to be read.

Step S72: searching for the data based on the storage address, and verifying verification information in a redundant ECC bit corresponding to the data.

Step S73: acquiring the data when the verification information is determined to be valid.

Specifically, when receiving the data reading request, the memory controller searches for matched data in the storage module based on the storage address in the data reading request, and obtains the verification information in the redundant ECC bit corresponding to the data.

In some embodiments, the verification information comprises a count value and an ECC value of the count value. When verifying the verification information in the redundant ECC bit corresponding to the data, the memory controller first verifies the count value based on the ECC value. If the count value is determined to be valid, the memory controller decrypts the data based on the count value, so as to obtain the data to be read.

In some embodiments, the verification information comprises a pre-stored message authentication code. When verifying the verification information in the redundant ECC bit corresponding to the data, the memory controller first obtains a calculated message authentication code of the data through calculating, and compares the calculated message authentication code with the pre-stored message authentication code of the verification information in the redundant ECC bit. If the calculated message authentication code is consistent with the pre-stored message authentication code, the verification information is determined to be valid; otherwise, the verification information is determined to be invalid.

The embodiments of reading the data correspond to the above-mentioned embodiments of writing the data, and descriptions of the same or similar parts involved are not repeated here.

Figure 8:
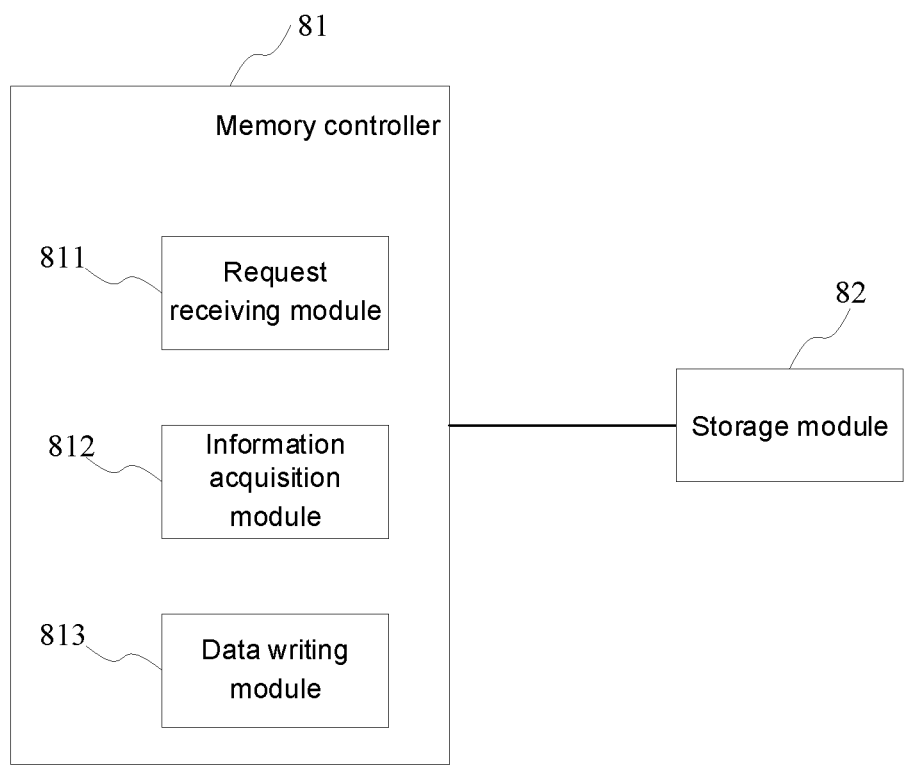
FIG. 8 shows a schematic structural diagram of a data security system according to an embodiment of the present disclosure.

In an embodiment, as shown in FIG. 8, a data security system of the present disclosure comprises a memory controller 81 and a storage module 82. The memory controller 81 comprises:

a request receiving module 811 configured to receive a data writing request, wherein the data writing request comprises data to be written to the storage module and a storage address of the data.

Specifically, when the data need to be written into a memory, the request receiving module 811 receives the data writing request sent by a user. The data writing request comprises the data that need to be written into the memory and the storage address of the data in the memory.

The request receiving module 811 is connected to an information acquisition module 812, which is configured to obtain verification information of the data.

The information acquisition module 812 is connected to a data writing module 813, which is configured to write the data into the storage address and write the verification information into a redundant ECC bit corresponding to the data.

In some embodiments, the data security system further comprises a counter, and the counter contains information of a count value and an ECC value. The verification information of the data comprises the count value and the ECC value. Specifically, the information acquisition module 812 is further configured to: update the count value of the counter to obtain an updated count value after receiving the data writing request, calculate the ECC value of the updated count value to obtain a calculated ECC value, and use the updated count value and the calculated ECC value as the verification information. In some embodiments, when the count value of the counter is updated, the information acquisition module 812 adds a preset value (e.g., 1) to the count value of the counter to obtain the updated count value. It should be noted that the initial count value of the counter may be set by a system. When obtaining the verification information, the data writing module 813 is further configured to process the data to obtain a processed data based on the updated count value, and to write the processed data into the storage address. Specifically, the data writing module 813 first encrypts the updated count value to obtain an encrypted count value, then performs an XOR operation on the encrypted count value and the data to obtain the processed data, and finally stores the processed data in the storage address. A key configured to encrypt the count value may be distributed by a key distribution module.

In some embodiments, the verification information of the data comprises a message authentication code. Specifically, the information acquisition module 812 obtains the message authentication code from a crypto logic module after receiving the data writing request, the data writing module 813 writes the data into the storage address and writes the message authentication code into the redundant ECC bit corresponding to the data.

The embodiments of the data security system correspond to the above-mentioned embodiments of the data security method, and descriptions of the same or similar parts involved are not repeated here.

Figure 9:
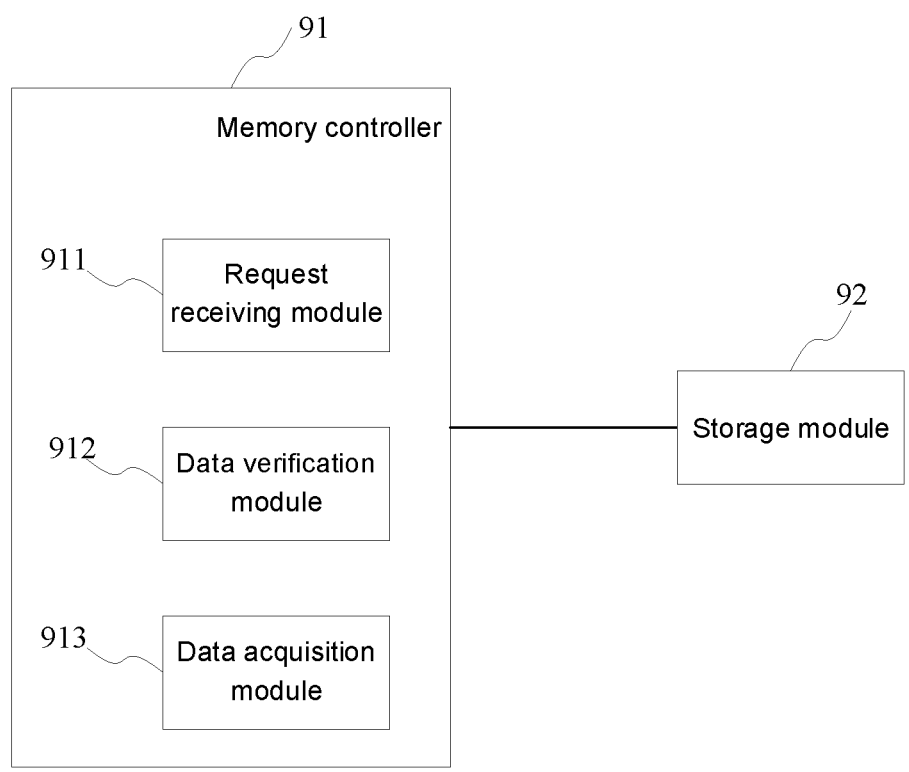
FIG. 9 shows a schematic structural diagram of a data security system according to another embodiment of the present disclosure.

In another embodiment, as shown in FIG. 9, a data security system of the present disclosure comprises a memory controller 91 and a storage module 92. The memory controller 91 comprises:
  a request receiving module 911 configured to receive a data reading request, wherein the data reading request comprises a storage address of data to be read.
  a data verification module 912, which is connected to the request receiving module 911 and is configured to search for the data based on the storage address and to verify verification information in a redundant ECC bit corresponding to the data.
  a data acquisition module 913, which is connected to the data verification module 912 and is configured to acquire the data when the verification information is determined to be valid.

In some embodiments, the verification information comprises a count value and an ECC value of the count value. The data verification module 912 is further configured to verify the count value based on the ECC value. If the count value is determined to be valid, the data verification module 912 decrypts the data based on the count value, so as to obtain the data to be read. In some embodiments, the verification information comprises a pre-stored message authentication code. The data verification module 912 is further configured to obtain a calculated message authentication code of the data through calculating, and compare the calculated message authentication code with the pre-stored message authentication code of the verification information in the redundant ECC bit. If the calculated message authentication code is consistent with the pre-stored message authentication code, the verification information is determined to be valid; otherwise, the verification information is determined to be invalid.

As described above, in the embodiment of the present disclosure, the verification information of the data is stored in the redundant ECC bit corresponding to the data. Thus, a more advanced and secure encryption algorithm is provided, which occupies no extra space while maintaining high bandwidth and throughput. In the encryption algorithm of the present application, when two plaintexts are the same, the corresponding ciphertexts can be different, so that attackers cannot distinguish or analyze the plaintexts through the ciphertexts. It can also better prevent replay attacks and further ensure data security. Therefore, the present disclosure effectively overcomes various drawbacks of the related technologies and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A data security method, applied to a memory controller, comprising:
  receiving at least one data writing request, wherein each data writing request comprises data to be written to a storage module and a storage address of the data;
  acquiring verification information of the data by: updating a count value of a counter to obtain an updated count value after each time receiving one of the at least one data writing request, calculating an Error-Correction-Code (ECC) value based on the updated count value, and using the updated count value and the ECC value as the verification information; and
  writing the data into the storage address, and writing the verification information into a redundant ECC bit corresponding to the data.

2. The data security method according to claim 1, wherein updating the count value of the counter comprises: adding a preset value to the count value of the counter to obtain the updated count value.

3. The data security method according to claim 1, wherein the counter contains information of the count value and the ECC value.

4. The data security method according to claim 1, wherein writing the data into the storage address comprises:
  processing the data to obtain a processed data based on the updated count value, and writing the processed data into the storage address.

5. The data security method according to claim 4, wherein processing the data to obtain a processed data based on the updated count value comprises:
  encrypting the updated count value to obtain an encrypted count value; and
  performing an XOR operation on the encrypted count value and the data to obtain the processed data.

6. The data security method according to claim 1, wherein the verification information further comprises a message authentication code, wherein acquiring the verification information of the data comprises: obtaining the message authentication code from a crypto logic module.

7. A data security method, applied to a memory controller, comprising:
  receiving a data reading request, wherein the data reading request comprises a storage address of data to be read;
  searching for the data based on the storage address, and verifying verification information in a redundant ECC bit corresponding to the data, wherein the verification information comprises a count value and an ECC value; and
  acquiring the data when the verification information is determined to be valid;
  wherein verifying the verification information in the redundant ECC bit corresponding to the data comprises: verifying the count value based on the ECC value, and decrypting the data based on the count value when the count value is determined to be valid, so as to obtain the data.

8. The data security method according to claim 6, wherein the verification information comprises a pre-stored message authentication code, wherein verifying the verification information in the redundant ECC bit corresponding to the data comprises:
  obtaining a calculated message authentication code of the data through calculating, and comparing the calculated message authentication code with the pre-stored message authentication code of the verification information in the redundant ECC bit.

9. A data security system, comprising a memory controller and a storage module, wherein the memory controller comprises:
  a request receiving module configured to receive at least one data writing request, wherein each data writing request comprises data to be written to the storage module and a storage address of the data;
  a counter, wherein the counter contains information of a count value and an ECC value;
  an information acquisition module configured to obtain verification information of the data; and
  a data writing module, configured to write the data into the storage address and write the verification information into a redundant ECC bit corresponding to the data;
  wherein the information acquisition module is further configured to:
  update the count value of the counter to obtain an updated count value after each time receiving one of at least one the data writing request; and
  calculate the ECC value based on the updated count value, and use the updated count value and the ECC value as the verification information.

10. The data security system according to claim 9, wherein the data writing module is further configured to:
  processing the data to obtain a processed data based on the updated count value, and writing the processed data into the storage address.

11. The data security system according to claim 10, comprising a key distribution module configured to distribute a key, wherein the data writing module is further configured to:
  encrypt the updated count value to obtain an encrypted count value by using the key; and
  performing an XOR operation on the encrypted count value and the data to obtain the processed data.

12. The data security system according to claim 9, comprising a crypto logic module configured to generate a message verification code, wherein the verification information further comprises the message verification code.

13. A data security system, comprising a memory controller and a storage module, wherein the memory controller comprises:
  a request receiving module configured to receive a data reading request, wherein the data reading request comprises a storage address of data to be read;
  a data verification module, which is configured to search for the data based on the storage address and to verify verification information in a redundant ECC bit corresponding to the data; and
  a data acquisition module configured to acquire the data when the verification information is determined to be valid;
  wherein the verification information comprises a count value and an ECC value, wherein the data verification module is further configured to:
  verify the count value based on the ECC value, and decrypt the data based on the count value when the count value is determined to be valid, so as to obtain the data.

14. The data security system according to claim 13, wherein the verification information comprises a pre-stored message authentication code,
  wherein the data verification module is further configured to: obtain a calculated message authentication code of the data through calculating, and compare the calculated message authentication code with the pre-stored message authentication code of the verification information in the redundant ECC bit.

* * * * *